June 25, 1929.　　S. CARLES ET AL　　1,718,854
PNEUMATIC WHEEL
Filed Jan. 5, 1928　　2 Sheets-Sheet 1

Inventors
Simeón Carlés and
Luis Mayolino
By B. Singer, Atty

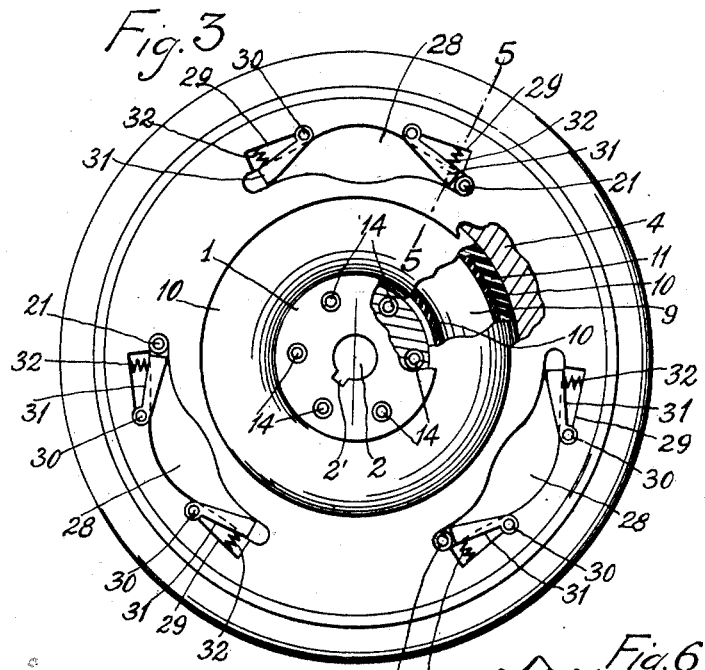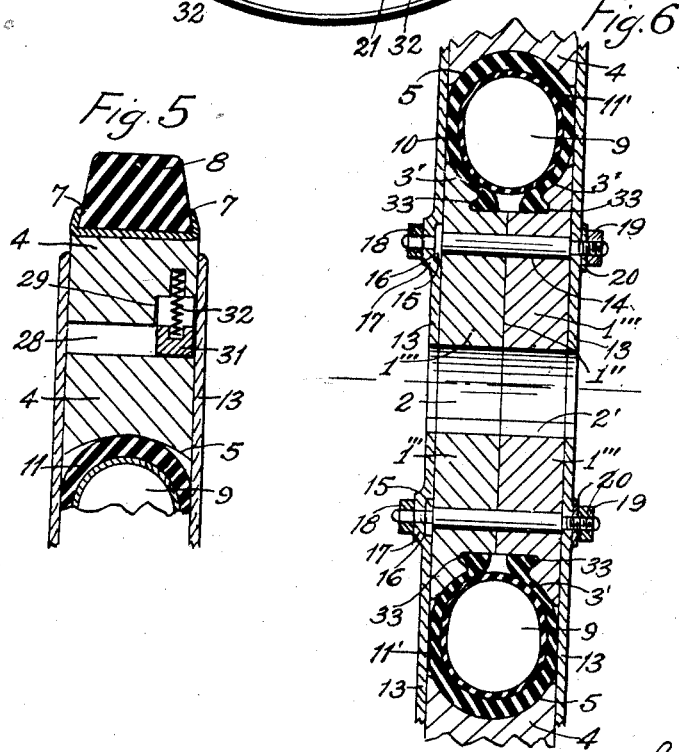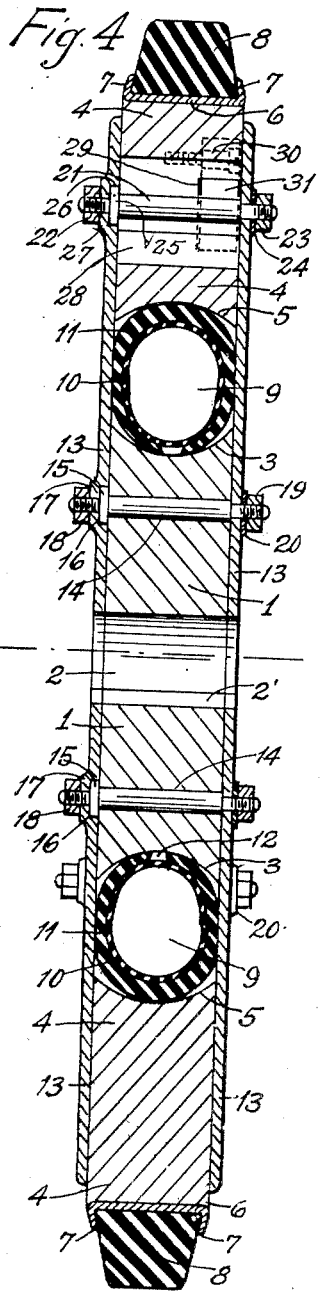

Patented June 25, 1929.

1,718,854

UNITED STATES PATENT OFFICE.

SIMEON CARLES AND LUIS MAYOLINO, OF HABANA, CUBA.

PNEUMATIC WHEEL.

Application filed January 5, 1928, Serial No. 244,721, and in Cuba December 28, 1927.

This invention relates to pneumatic wheels, specially those used for vehicles, and its main object is to provide a wheel of that class embodying means whereby when the inner tube is punctured and the rim becomes excentric the rim is caused automatically to reassume its concentric condition, thus preventing accident to the vehicle and the destruction of the inner tube and tire.
Another object of the invention is to provide a pneumatic wheel for vehicles in which the tube and pneumatic tire are separated from the tread portion of the wheel and arranged in the interior of the wheel, thus offering less volume with minor cost than the inner tubes and pneumatic tires in use heretofore.

The invention is described with reference to the figures of the annexed drawing, in which:

Fig. is an outer front view of the wheel.

Fig. 3 is a view similar to Fig. 2, partially broken away, in the position in which once the tube has been punctured, the wheel has been self-centered again through the proper mechanical means.
Fig. 4 is a section taken on the vertical diametral line in Fig. 2.

Fig. 5 is a partial diametral section of the wheel on line 5—5 of Fig. 3.

Fig. 6 is a partial diametral section similar to that of Fig. 4, showing a modified form of the central body of the wheel.

Figure 1:
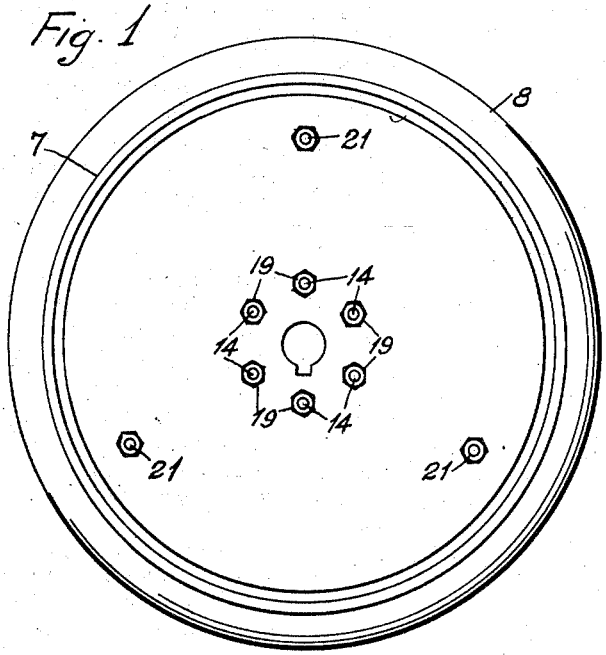
Figure 2:
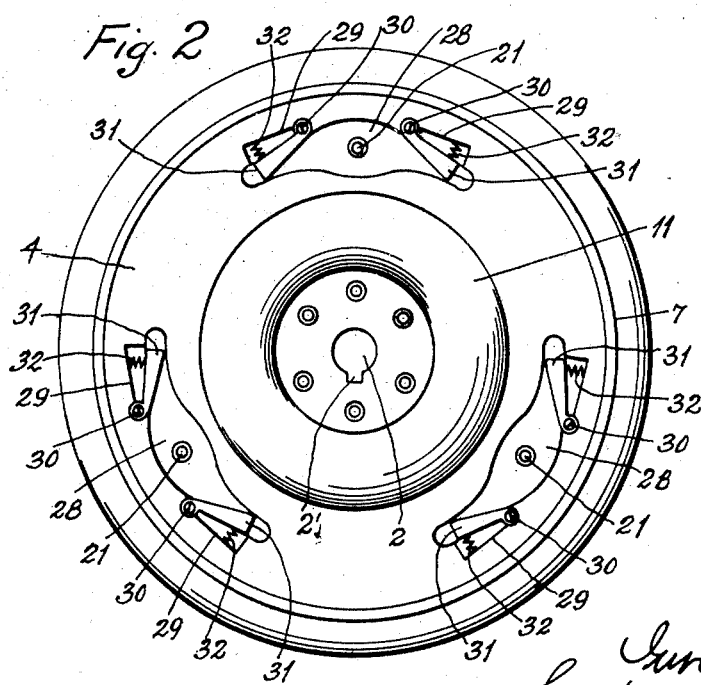
Fig. 2 is a view similar to Fig. 1 in the normal position in which the tube is full of air, one of the outer discs being taken off.

In Figs. 1, 2, 3 and 4, is illustrated a wheel composed of a main central body 1 provided with a central opening 2 with wedge-way 2' for the passage and securing of a shaft (not shown), and said central body 1 has at its periphery a channel 3 for seating of the tube and tire as will be hereinafter explained. Around said main body 1 and separated from the same is an annular body 4 which may be of metal or of wood, the same as the central body 1, and which has at its inner periphery a channel 5 of curvature opposite to channel 3 of main body 1 and at its outer periphery has a fixed metal rim 6 provided with raised flanges 7 forming a channel open to the outside in which is fitted a solid tire 8 designed to tread on the ground. In the space 9 comprised between the channels 3 and 5 of the central body 1 and annular body 4 respectively is disposed a tube 10 within a shoe or rubber tire 11 which may be divided by a slot or cut 12 between its borders, which slot is preferably placed on channel 3 of main body 1. Both bodies, the central 1 and annular 4, are covered on their two faces by means of two plates or discs 13 which are secured to said main body 1 by means of a plurality of bolts 14 arranged in a circle and equidistant from one another and which pass through holes in said plates 13 and through openings in the main body 1, each of said bolts having on one end portion a transverse annular flange 15 which seats in a corresponding recess 16 in one of plates 13 in the inner face of an abutment 17 projecting out from the disc or plate to retain in position the bolt 14 so that it may not slide transversely, and on the projecting threaded ends of each bolt 14 is threaded at the corresponding end of abutment 17 a nut 18, and on the opposite end a nut 19 against a washer 20.

Plates 13 have fixed through holes in the same a plurality (three are indicated in the drawing) of bolts 21 fixed (in the same manner as screws 14) by means of nuts 22 and 23 and washer 24, these bolts 21 serving to avoid bulging of plates 13 under lateral movement of outer body 4, and each bolt 21 having a transverse annular flange 25 which fits in an inner recess 26 corresponding to an outer abutment 27 of one of the discs 13, and said bolts are equidistant from the center of the wheel and equidistant from one another, the same passing through slots 28 in the outer annular body 4. Said slots 28 are wider at the center than at the ends and have curved faces which lead to the ends which are rounded and of such a diameter that in the same the bolts 21 are tightly fitted, and at each end portion of the outer face of each slot 28 is formed an angular recess 29 of straight faces at about right angles with one another and in whose farther end is transversely mounted a pin 30 which acts as the pivoting shaft to a detent 31 which owing to the tension of a coil spring 32 tends to press the free portion of said detent 31 against the inner face of slot 28 until engaging the same. In this manner there are formed two sets of detents 31 and springs 32 at the opposite ends of each slot 28 and in opposite positions.

In the normal operation of the wheel the inflated tube 10 keeps the annular body 4 secured to the central body 1, owing to the friction, both being in concentric position, but when for any reason the tube 10 is punctured, owing to the weight of the vehicle it tends immediately to descentralize the central body 1 with respect to the outer annular body 4. Thereupon the bolts 21 which normally occupied a place in the central portion of slots 28, advance ends of the same, according to the direction of rotation, and thereby overcome the tension of the springs 32, so that the detents 31 become lodged in one of the round ends of the slots 28 in which ends they are retained by the free movement of the corresponding detent 31 on its pivot 30, once the bolts 21 have passed beyond the free end of the same, and hence the central body 1 will be perfectly centered with respect to the outer annular body 4, and the wheel may continue rotating without there being any danger of accident or of destruction of the tube 10 and shoe 11.

In Fig. 6 is shown a modified form of the wheel in which the main central body 1" is composed of two members 1''' the abutting inner faces of which are parallel with and midway between the discs 13 and the peripheral channel 3' of the main body 1" has a proper section for fitting the flanges or beads 33 of a tire 11' of the common type which embraces the tube 10. In this form the division of main body 1" in two halves, permits the easy installation from one side of tube 10 with its tire 11'.

Once both bodies 1 and 4 are centered, in order to replace inner tube 10 or to repair the same, dismount the wheel by taking off nuts 19 and 23 from the bolts 14 and 21, place again tube 10 with its shoe or tire, and mount again the separated parts, tightening the bolts by means of the nuts.

It is obvious that the details of construction of the wheel may vary without altering the essential feature of the invention, which is as set forth in the following claims.

What we claim is:—

1. In a pneumatic wheel having a central circular body, an outer annular body concentrically spaced from the first body, a tube in the annular space between said bodies, and plates covering the outer sides of said bodies, a driving connection between the plates and the outer body, which comprises a plurality of bolts fixing the plates to each other and passing through elongated slots formed in the outer body, and detents pivotally mounted near one end of said slots and actuated by springs, which detents are adapted to retain said bolts against the ends of the slots to maintain concentricity of said bodies in case of deflation of said tube.

2. In a pneumatic wheel having a central circular body, an annular body concentrically spaced from the first body, a tube in the annular space between said bodies, and plates covering the outer sides of said bodies, a driving connection between the plates and the outer body, which comprises a plurality of bolts fixing the plates to each other and passing through elongated slots formed in the outer body, and detents pivotally mounted near both ends of said slots and actuated by springs, which detents are adapted to retain said bolts against the ends of the slots, to maintain concentricity of said bodies in case of deflation of said tube.

3. In a pneumatic wheel having a central circular body, an annular body concentrically spaced from the first body, a tube in the annular space between said bodies, and plates covering the outer sides of said bodies, a driving connection between the plates and the outer body, which comprises a plurality of bolts equidistant from the center of the wheel and equidistant from one another, which tighten the plates against the bodies and pass through elongated slots of arched shape and wider at their centers than at their ends and formed in the outer annular body, detents pivotally mounted in opposite positions to each other near the ends of said slots and actuated by springs normally tending to throw the free end of said detents towards the interior of the slots, said detents being adapted to retain said bolts against the ends of the slots to maintain concentricity of said bodies in case of deflation of said tube.

In witness whereof we affix our signatures.

SIMEON CARLES.
LUIS MAYOLINO.